(12) United States Patent
Krumm et al.

(10) Patent No.: US 8,734,644 B1
(45) Date of Patent: May 27, 2014

(54) LIQUID PURIFICATION APPARATUS

(75) Inventors: Ronald Walter Krumm, Cinnaminson, NJ (US); John Henry Abel, Bethlehem, PA (US); Gary Ellsworth McQuay, Watsontown, PA (US)

(73) Assignee: Puritek, Inc., Short Hills, NJ (US)

( * ) Notice: Subject to any disclaimer, the term of this patent is extended or adjusted under 35 U.S.C. 154(b) by 777 days.

(21) Appl. No.: 12/925,833

(22) Filed: Nov. 1, 2010

Related U.S. Application Data

(60) Provisional application No. 61/280,090, filed on Oct. 30, 2009.

(51) Int. Cl.
*C02F 1/68* (2006.01)
*C02F 1/76* (2006.01)
*B01D 35/00* (2006.01)

(52) U.S. Cl.
USPC ........................................... 210/206; 210/241

(58) Field of Classification Search
USPC ......... 210/663, 669, 683, 753, 764, 206, 241, 210/902; 422/263
See application file for complete search history.

(56) References Cited

U.S. PATENT DOCUMENTS

| | | | | |
|---|---|---|---|---|
| 4,888,118 A | * | 12/1989 | Barnes et al. | 210/753 |
| 5,518,613 A | * | 5/1996 | Koczur et al. | 210/753 |
| 2002/0155149 A1 | * | 10/2002 | Gottlund et al. | 424/446 |

* cited by examiner

*Primary Examiner* — Lucas Stelling
(74) *Attorney, Agent, or Firm* — Law Firm of Walter D. Ames

(57) ABSTRACT

A portable apparatus for decontaminating water, having an iodine release section in which iodine, often from a charged nylon iodophor, is released into the water, followed by an iodine recapture section in which a nylon polymer removes iodine from the water by forming an iodophor with it.

15 Claims, 1 Drawing Sheet

LIQUID PURIFICATION APPARATUS

Figures 1, 2:
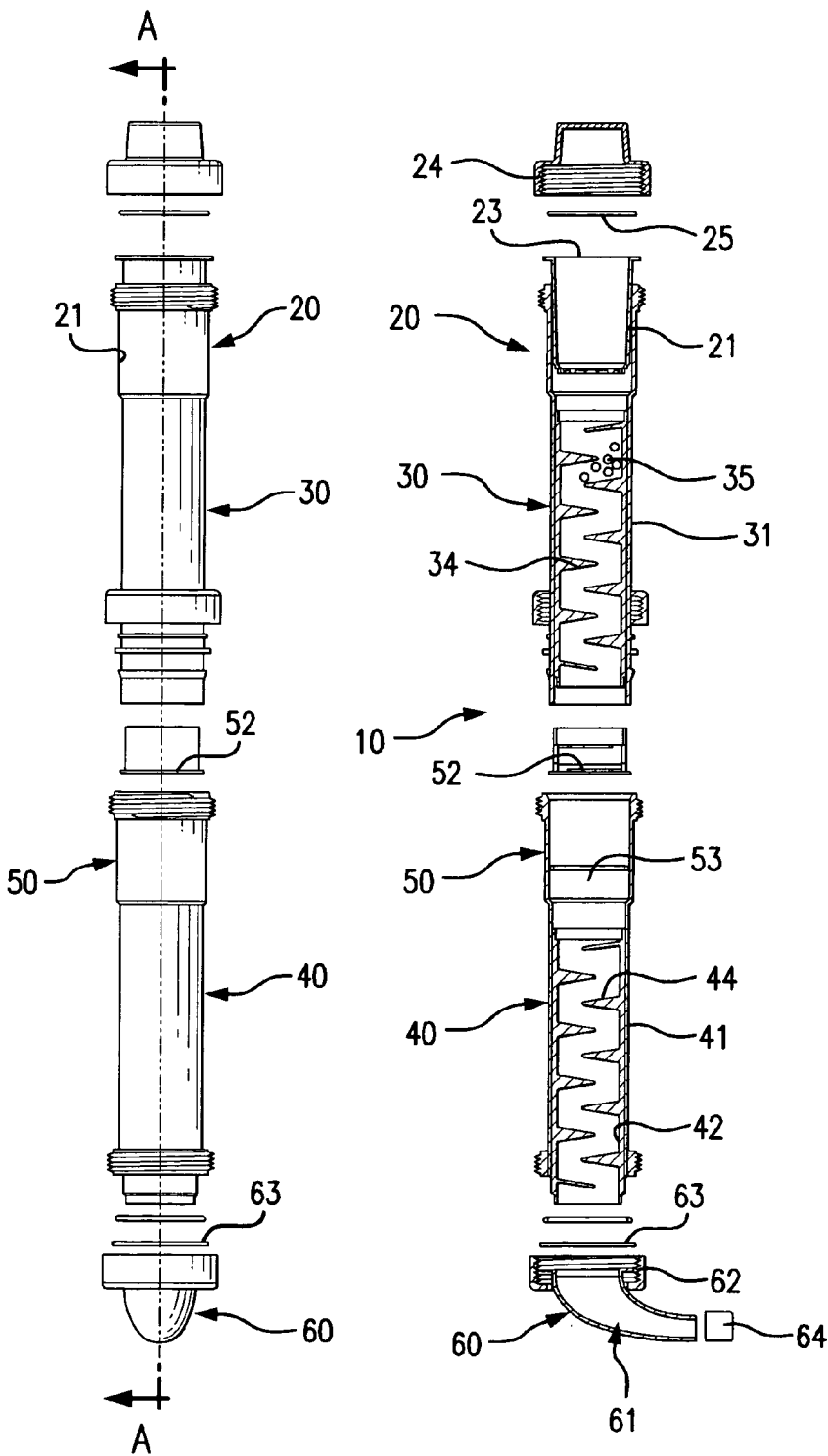

Applicants claim the benefit of Provisional Application Ser. No. 61/280,090, filed Oct. 30, 2009, for all common subject matter.

FIELD OF THE INVENTION

The present invention relates generally to apparatus for decontaminating fluids. More specifically, it relates to apparatus for purifying liquids such as water, by means of which impure water may be poured into one end of the device and decontaminated water retrieved at the other end.

BACKGROUND OF THE INVENTION

For many years it has been known that iodine is an excellent decontaminating agent for killing biologic impurities in water and other liquids that are to be made suitable for imbibing. Thus, while iodine is readily available in the form of the element, itself, or in the form of a salt such as potassium iodide, its use particularly in apparatus intended for usage by individuals, has been limited not so much by its lack of effectiveness but by the unpleasant odor and taste that accompanies its use.

Efforts have been made to overcome the unpleasant, indeed noxious odor that accompanies the use of iodine in decontaminating procedures. The result of one such effort is U.S. Pat. No. 7,517,537, which issued on Apr. 14, 2009 to Kathy L. Gottlund as assigned to Puritek, Inc., the disclosure of which patent is incorporated by reference as though fully set forth herein. The Gottlund patent recognizes that different nylon polymers combine with iodine to form iodophors at different rates, and that the so-formed iodophors dissociate at different rates. That patent posits a solution to the problem of iodine capture as iodophors by utilizing as a sequestering agent a nylon polymer selected from the group consisting of nylon-6, nylon-6,6, and nylon-4,6 from which to form iodophors that will reduce the distaste and off color of solutions where iodine that has been used as a purification agent.

Even with such knowledge, however, it has become apparent that existing water purification apparatus, either large scale or on a lesser scale for personal use, involve a compromise between the delivery of sufficient lethality for rapid disinfection of the contaminants in the water, and the generation of noxious or even toxic residues and odors that are present during the iodine disinfectant process. There is usually a tradeoff between utilizing sufficient purifying agent to completely decontaminate the liquid to be made potable, while at the same time achieving a purified product that can be consumed, even relished by an individual.

It is, therefore, a primary object of the present invention to provide a relatively simple and effective apparatus for decontaminating a liquid such as water while at the same time providing an effluent that will be substantially free from noxious odors and taste and will be readily potable.

It is another object of our invention to provide such an apparatus that will be economical in acquisition and use, and that will be portable and enable an individual to use it without having to add or mix chemicals.

It is still another object of our invention to provide such an apparatus that can easily be assembled and disassembled so that, should the need arise, parts thereof can be renewed or substituted without requiring replacement of the entire device.

SUMMARY OF THE INVENTION

The present invention is directed to a portable apparatus for decontaminating a liquid containing impurities. In its most basic form it comprises two sections: first, there is an iodine release section formed from an iodine source having such quantities of loosely bound or readily available iodine that, when contacted by an impure liquid, some of the iodine will be released from the source into the liquid in amount that will destroy impurities therein. The second section recaptures the iodine from the release section in the liquid. It is formed from a nylon polymer have none or so little bound iodine that it will complex with the iodine from the release section and recapture and remove that iodine from the liquid that has now been decontaminated.

From this basic structure, many additional improvements and refinements have been made. The iodine release section may be formed from a nylon iodophor that will release iodine into the contaminated liquid. With respect to the nylon iodophor used in either or both the release and recapture sections of the device, the nylon polymer may be selected from the group consisting of nylon-4, nylon-6, nylon-4,6 and nylon-6,6, with nylon-6 being the most preferred polymer, particularly for use in the iodine recapture section.

With respect to preferred structures of the apparatus, either or both of the release and recapture sections may be formed with an inner shell of nylon iodophor that contacts the liquid being decontaminated; to add to structural integrity, each inner shell may be surrounded by an outer casing that is constructed of metal or a polymer other than nylon or other polymer that forms an iodophor with iodine. Preferably the iodine release section has spaced, inwardly projecting parts or vanes that cause the incoming liquid to follow a somewhat tortuous path in order to improve its contact with the iodine-releasing nylon iodopohor, and as an added source of iodine, iodine or potassium iodide pellets may be charged into the release section and/or adhesively located on those vanes.

In the most presently preferred embodiment of our invention, the iodine release and recapture sections are joined together so that they are easily separated for cleaning, rejuvenation or replacement. Additional parts may be provided for convenience in handling the device. Thus, in that best mode of the invention, provided are an intake section positioned prior to the iodine release section, and an outlet section located subsequent to the iodine recapture section. Filters may be conveniently located between the intake section and the release section, between the release section and the recapture section, and between the recapture section and the outlet section, all to filter out particulate impurities that may be in or formed during the operation of the purification apparatus. Further, should additional sources of iodine be required, beads of iodine release material may be affixed to vanes that provide agitation of liquid in the iodine release section, the beads dissolving slowly in the presence of the contaminated liquid as it passes in contact with them.

These and other features, objects and advantages of the present invention will become more apparent when considered in connection with a detailed description of a preferred embodiment of the invention and a drawing thereof in which FIG. 1 is an exploded, elevational view of the apparatus, and FIG. 2 is a sectional view taken along the line A-A of FIG. 1.

DETAILED DESCRIPTION OF PREFERRED EMBODIMENT

Referring now to both FIGS. 1 and 2 of the drawings, the entire apparatus, indicated generally by the arrows 10, consists of a plurality of sections that are releasably joined so that the apparatus 10 can be disassembled and then reassembled should the need arise, e.g., a need to remove accumulated debris from the several filters.

Beginning with the inlet of liquid into the apparatus, the best mode of the apparatus is formed with an inlet section indicated by numeral 20. As presently constructed, this section consists of an outer shell 21 formed from a metal or a plastic polymer other than nylon. A plastic basket 22 is mounted within the outer shell section 21, and the basket is formed with a bottom that acts as a filter for contaminated fluid entering through the mouth 23 of the basket. Sealing the mouth of the basket 22 to prevent the intake of unwanted foreign materials is a removable end cap 24. With the provision of an intermediary O-ring 25, the end cap can be applied or removed as desired.

Proceeding in the direction of liquid flow, the next section is an iodine release section 30, which is also formed with an outer shell 31 of a polymer other than nylon. Positioned within that shell 31 is a one-piece length nylon polymer 33, which may be selected from the group consisting of nylon-4, nylon-4,6, nylon-6 and nylon-6,6, with nylon-6 being the preferred polymer. This nylon polymer has preferably been saturated with iodine so that it is in the form of an iodophor that will release iodine when contacted by a fluid. The structure of the iodine release section is such as to encourage agitation of the liquid within it and, therefore, full contact of that liquid with the nylon iodophor as the liquid passes through the iodine release section. Thus, in our best mode, the interior of the iodine release section is formed with inwardly extending vanes 34 that cause turbulence in the liquid as it passes through the interior of the release section 30. Further the vanes 34 can serve to retain additional supplies of iodine such as beads of iodine or iodinated nylon polymer 35 that are illustrated generally as being affixed to a vane 34 near the liquid entry port of the section so that additional amounts of iodine will be available to disinfect organisms in the liquid in the iodine release section 30. The interior of the release section can also be charged with iodine or iodine releasing materials as required.

Also illustrated in both FIGS. 1 and 2 is the iodine recapture section 40 of the decontaminating apparatus 10. In the flow pattern of the contaminated liquid, the recapture section 40 is spaced from the release section 30 by an intermediate section 50 that contains filters for removing impurities that may have precipitated out as a result of the liquid having passed through the release section 30. As illustrated in the drawings of our preferred embodiment, a charcoal filter 51 is employed as a primary filter, together with mechanical filters 52. Suitable O-rings 53 maintain the integrity of the device and keep the apparatus substantially liquid tight.

The iodine recapture section 40 serves to capture the iodine that has been released into the formerly contaminated liquid. In a structure similar to that of the iodine release section 30, the recapture section 40 is formed with an outer shell 41 composed of a polymer other than nylon, e.g., polypropylene, or metal, and an inner, operable length 42 of nylon polymer that has not been impregnated with iodine, such that, in the presence of iodine, the nylon polymer will form an iodophor. In order to maintain a degree of turbulence in the iodinated liquid as it passes through, the iodine recapture section 40 also contains vanes 44 that create what may be termed a waterfall effect in the liquid.

The final section of the apparatus is an outlet section 60 from which liquid emerges from the apparatus. In our preferred embodiment the outlet section includes a mouthpiece 61 secured to the outlet of the recapture section 40 by a threaded coupling 62 with the interposition of a bottom filter 63. The mouthpiece may be provided with a cap 64 to be put in place over the mouthpiece when the apparatus is not in use.

In use, end cap 24 is removed from the inlet section 20 and water that may be contaminated is poured into the open mouth of the section, where it passes through filter basket 23 and aggregated impurities are removed. As the apparatus is assembled, the water then passes into the iodine release section 30 where the opposed vanes 34 create a cascading or waterfall effect that brings the water into turbulent contact both with the nylon iodophor from which the inner portion of the section 30 is formed as well as any beads of iodine releasing materials located within the section. After passage through more optional filters, the liquid enters the iodine recapture section 40 where, assisted by turbulence created by the vanes 44, by virtue of contact with the nylon polymer wall 42 of the section, iodine is removed from the now purified liquid. The iodine then flows by gravity or by suction to an outlet section 60, from which it may be directly imbibed by use of a mouthpiece 61. Specifically, mouthpiece 61 is shaped so that it will fit into the mouth of a user who can apply suction to impel liquid through the apparatus.

In its operable form, the present apparatus permits most classes of pathogens to be destroyed after a brief exposure to iodine in the release section, perhaps as little as 10 seconds of exposure. At the same time the almost complete iodine recapture ensures that the user is not exposed to unsafe levels of iodine. Certain pathogens such as *staphylococcus aureus* are more difficult to kill, owing to a resistant carbohydrate shell. EDTA has been found to be effective as a penetrating agent and, where requisite, can be incorporated into the biocidal chamber, i.e., the iodine release section.

The present invention makes use of nylon's strong bond with iodine, which cannot be attributed simply to ionic or covalent bonding. Rather, the iodophor exhibits the property of an inclusion compound or clathrate, which is the perfect spatial fit of iodine into nylon's molecular structure. Other structural polymers exhibit no such affinity for iodine. This allows nylon iodophors to function as contact biocides. As the pathogen in the fluid passes over the polymer surface, it reacts with an iodine atom which denatures the proteins and nucleic acids of the organism. The reacted iodine atom is replaced by an adjoining, bound iodine atom in the polymer chain as the iodophor mass maintains equilibrium. The entire mass in the chamber is, therefore, a continuing source of iodine until the iodine has become depleted to a concentration too low to maintain a lethal iodine/iodophor equilibrium. This occurs only after a substantial period of time.

It will be apparent that certain alterations and modifications of the preferred embodiment of the invention illustrated and described herein will be apparent to those of skill in this art. As to all such obvious changes, it is desired that they be included within the purview of our invention, which is to be limited only by the scope, including equivalents, of the following, appended claims.

We claim:

1. A portable apparatus for decontaminating a liquid containing impurities, comprising a longitudinally extending iodine release section formed from an outer shell of a metal or a polymer other than nylon and an inner shell formed from a nylon iodophor having such quantities of bound iodine that, when contacted by said impure liquid, at least some of said bound iodine is released from said iodophor into said liquid in an amount that destroys impurities, said outer release shell and said inner release shell extending along a major portion of the length of said release section, and a longitudinally extending iodine recapture section positioned after said iodine release section to receive liquid therefrom, said recapture section being formed from an outer shell of metal or a polymer other than nylon and an inner shell formed from a nylon polymer having none or so little bound iodine that it will complex with iodine in liquid from said iodine release section to recapture and remove iodine from said liquid, said outer recapture shell and said inner recapture shell extending along a major portion of the length of said recapture section, said release and recapture sections being joined together so that they can be separated for cleaning or replacement.

2. A portable apparatus for decontaminating a liquid containing impurities as claimed in claim 1, in which said inner shell of said iodine release section is formed from a nylon iodophor in which the nylon polymer is selected from the group consisting of nylon-4, nylon-4,6, nylon-6 and nylon-6,6.

3. A portable apparatus for decontaminating a liquid containing impurities as claimed in claim 1, in which said inner shell of said iodine recapture section is formed from a nylon iodophor in which the nylon polymer is selected from the group consisting of nylon-4,6, nylon-6 and nylon-6,6.

4. A portable apparatus for decontaminating a liquid containing impurities as claimed in claim 1, in which said inner shell of said release section is formed from an iodophor of nylon-6.

5. A portable apparatus for decontaminating a liquid containing impurities as claimed in claim 1, in which said inner shell of said iodine recapture section is formed from nylon-6.

6. A portable apparatus for decontaminating a liquid containing impurities as claimed in claim 1, further comprising a liquid intake section positioned prior to said iodine release section.

7. A portable apparatus for decontaminating a liquid containing impurities as claimed in claim 6, further comprising a liquid outlet section positioned subsequent to said iodine recapture section.

8. A portable apparatus for decontaminating a liquid containing impurities as claimed in claim 6, further comprising a filter positioned between said liquid intake section and said iodine release section.

9. A portable apparatus for decontaminating a liquid containing impurities as claimed in claim 7, further comprising a filter positioned between said iodine recapture section and said liquid outlet section.

10. A portable apparatus for decontaminating a liquid containing impurities as claimed in claim 1, in which said outer recapture shell and said inner recapture shell extend along the entirety of said recapture section.

11. A portable apparatus for decontaminating a liquid containing impurities as claimed in claim 1, in which said outer release shell and said inner release shell extend along the entirety of said release section.

12. A portable apparatus for decontaminating a liquid containing impurities, comprising a longitudinally extending iodine release section formed from an outer shell of a metal or a polymer other than nylon and an inner shell formed from a nylon iodophor having such quantities of bound iodine that, when contacted by said impure liquid, at least some of said bound iodine is released from said iodophor into said liquid in an amount that destroys impurities, said outer release shell and said inner release shell extending along the length of said release section, and a longitudinally extending iodine recapture section positioned after said iodine release section to receive liquid therefrom, said recapture section being formed from an outer shell of metal or a polymer other than nylon and an inner shell formed from a nylon polymer having none or so little bound iodine that it will complex with iodine in liquid from said iodine release section to recapture and remove iodine from said liquid, said outer recapture shell and said inner recapture shell extending along the length of said recapture section, said inner shell of said release section being formed with vanes that project inwardly toward the axis of said shell and into the path of flow of said impure liquid.

13. A portable apparatus for decontaminating a liquid containing impurities as claimed in claim 12, in which said vanes are spaced from each other and carry additional, iodine releasing material.

14. A portable apparatus for decontaminating a liquid containing impurities as claimed in claim 12, in which said inner shell of said recapture section is formed with vanes that project inwardly toward the axis of said shell and into the path of flow of said liquid.

15. A portable apparatus for decontaminating a liquid containing impurities as claimed in claim 14, in which said vanes are spaced from each other and carry additional, iodine complexing material.

\* \* \* \* \*